US010738248B2

(12) United States Patent
Pfeil

(10) Patent No.: US 10,738,248 B2
(45) Date of Patent: Aug. 11, 2020

(54) METHOD AND APPARATUS FOR PURIFYING A MIXTURE COMPRISING OIL AND WAX

(71) Applicant: Sulzer Chemtech AG, Winterthur (CH)

(72) Inventor: Mathias Pfeil, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 16/082,131

(22) PCT Filed: Aug. 31, 2017

(86) PCT No.: PCT/EP2017/071901
§ 371 (c)(1),
(2) Date: Sep. 4, 2018

(87) PCT Pub. No.: WO2018/103902
PCT Pub. Date: Jun. 14, 2018

(65) Prior Publication Data
US 2019/0040330 A1 Feb. 7, 2019

(30) Foreign Application Priority Data

Dec. 9, 2016 (EP) .................................... 16203139

(51) Int. Cl.
*C10G 73/02* (2006.01)
*C10G 73/00* (2006.01)
(Continued)

(52) U.S. Cl.
CPC ............. *C10G 73/02* (2013.01); *B01D 9/004* (2013.01); *B01D 9/0013* (2013.01);
(Continued)

(58) Field of Classification Search
None
See application file for complete search history.

(56) References Cited

U.S. PATENT DOCUMENTS 2,979,453 A * 4/1961 Kiersted, Jr. ........ B01D 9/0059
208/31
3,006,839 A 10/1961 Arabian et al.
(Continued)

FOREIGN PATENT DOCUMENTS

CN 102060651 A 5/2011
CN 104418721 A 3/2015
(Continued)

*Primary Examiner* — Tam M Nguyen
(74) *Attorney, Agent, or Firm* — Larson & Anderson, LLC

(57) ABSTRACT

The present invention relates to a method for fractionating a crude mixture comprising at least one oil and at least one wax, which comprises the following method steps: (a) carrying out a pre-fractionation stage as a layer crystallization (i) with a crude mixture comprising at least one oil and at least one wax or (ii) with a crude solvent mixture obtained by adding prior to the pre-fractionation stage at most 100% by weight of solvent relative to the weight of the crude mixture, to prepare a first fraction containing low waxy oil and a second fraction containing low oily wax, (b) carrying out a first crystallization stage including (b1) a first suspension crystallization sub-stage with the first fraction containing low waxy oil to prepare a third fraction containing dewaxed oil and a fourth fraction and (b2) after the first suspension crystallization sub-stage, a second suspension crystallization sub-stage with a mixture of the fourth fraction obtained in method step (b1) and the second fraction containing low oily wax obtained in the pre-fractionation stage of method step (a) to prepare a fifth fraction containing slack wax and a sixth fraction.

11 Claims, 2 Drawing Sheets

Figure 1:
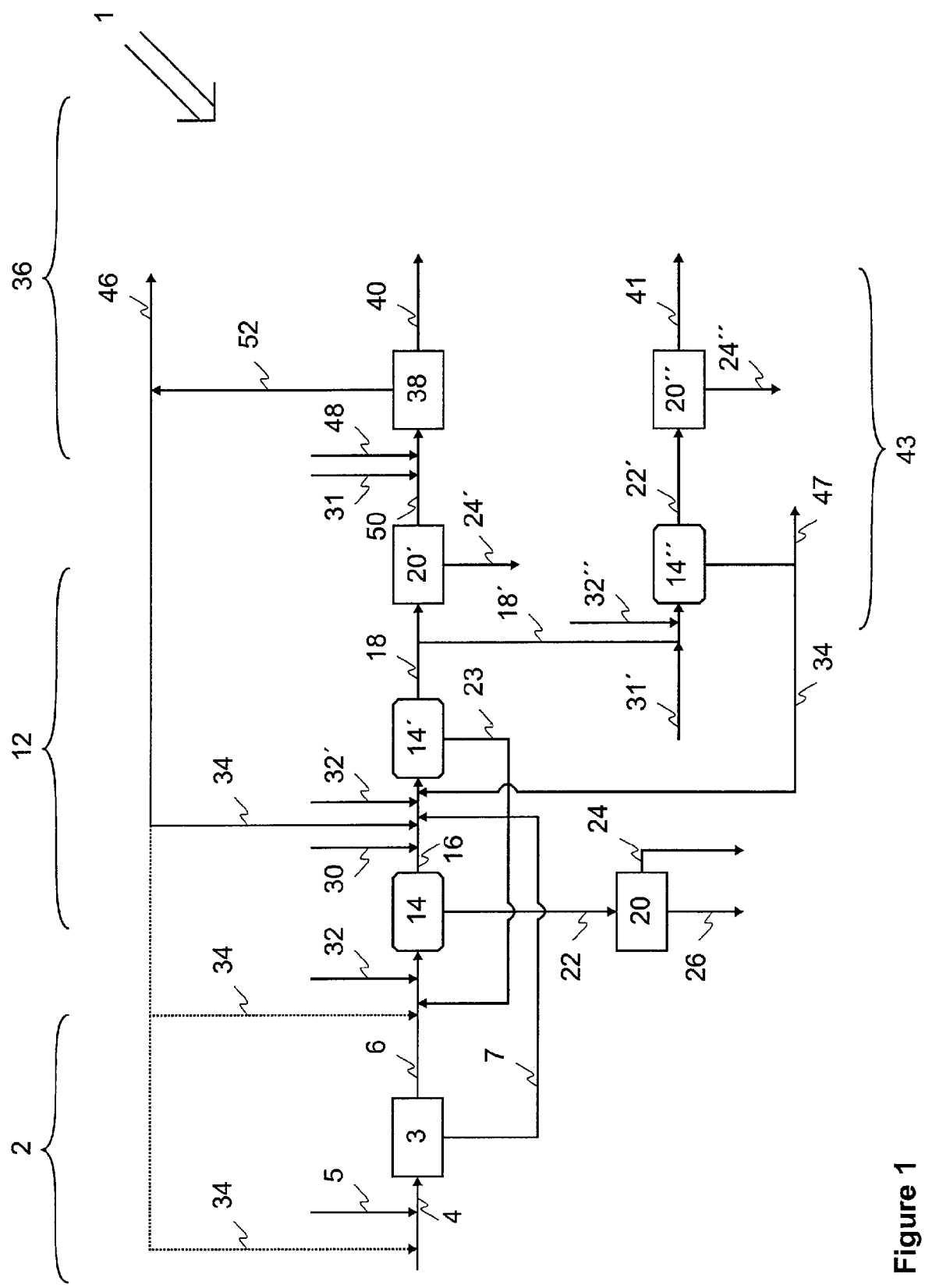

(51) Int. Cl.
*C10G 73/38* (2006.01)
*B01D 9/00* (2006.01)
*C11B 3/16* (2006.01)
*C11B 3/00* (2006.01)
*C11B 7/00* (2006.01)
*C11B 3/10* (2006.01)
*C11B 3/12* (2006.01)
*C10G 73/42* (2006.01)

(52) U.S. Cl.
CPC ........... *B01D 9/0059* (2013.01); *C10G 73/00* (2013.01); *C10G 73/38* (2013.01); *C10G 73/42* (2013.01); *C11B 3/001* (2013.01); *C11B 3/10* (2013.01); *C11B 3/12* (2013.01); *C11B 3/16* (2013.01); *C11B 7/0075* (2013.01); *C10G 2300/1033* (2013.01)

(56) References Cited

U.S. PATENT DOCUMENTS

| | | | | |
|---|---|---|---|---|
| 3,067,125 A | * | 12/1962 | Kemp | C10G 73/06 208/33 |
| 3,649,708 A | | 3/1972 | Schroeder et al. | |
| 4,115,245 A | * | 9/1978 | Harrison | C10G 73/32 208/33 |
| 5,358,625 A | * | 10/1994 | Gould | B01D 61/02 208/31 |
| 5,360,530 A | * | 11/1994 | Gould | C10G 73/06 208/31 |
| 5,474,668 A | * | 12/1995 | Ackerson | C10G 73/025 208/33 |
| 5,494,566 A | * | 2/1996 | Gould | C10G 73/06 208/31 |
| 5,620,588 A | * | 4/1997 | Ackerson | C10G 73/025 208/33 |
| 6,413,480 B1 | | 7/2002 | Vishnevsky | |
| 2002/0096451 A1 | * | 7/2002 | Ackerson | C10G 21/02 208/27 |

FOREIGN PATENT DOCUMENTS

| | | |
|---|---|---|
| EP | 2690156 A1 | 1/2014 |
| SU | 513070 A1 | 5/1976 |
| SU | 1121284 A1 | 10/1984 |
| WO | 01/70654 A1 | 9/2001 |
| WO | 2007074223 A2 | 7/2007 |

* cited by examiner

METHOD AND APPARATUS FOR PURIFYING A MIXTURE COMPRISING OIL AND WAX

The present invention relates to a method for fractionating a crude mixture comprising at least one oil and at least one wax, such as for fractionating a mineral or a synthetic oil contaminated with wax, such as contaminated with paraffin wax.

Oils, such as mineral oils, vegetable oils or synthetic oils prepared for instance by Fischer-Tropsch synthesis, are an important raw material in various industries in a plurality of applications and chemical processes. However, such oils are usually contaminated with a significant amount of waxes, which have to be removed, in order to improve the quality of the oil, such as in order to reduce its cloud, as measured with ASTM D2500 or ASTM D5773. Oil is defined in this connection as a hydrocarbon, mainly as an alkanes including composition, which is liquid at ambient temperature and which is highly soluble in methyl ethyl ketone. In contrast thereto, wax is defined in this connection as a hydrocarbon, mainly as an alkanes including composition, which is a plastic solid at ambient temperature, and which is not soluble in methyl ethyl ketone when determined in accordance with ASTM D721 or DIN 51531.

Several techniques are known for dewaxing crude oil being contaminated with wax. Namely, among others crystallization of the waxes from the oil fraction, selective dissolution of the oil fraction in a solvent, which does not dissolve the wax, and microbiological methods.

Crystallization based dewaxing processes have gained in importance during the last years, because they are suitable to dewax oil quite efficiently and with a quite low energy demand. Such crystallization based dewaxing processes can be roughly divided into two groups, namely into solvent-free crystallization methods and into crystallization methods making use of solvents.

The latter methods making use of solvents are useable for crude oils including all kind of waxes independent from their molecular weight and are typically performed by mixing the crude oil with a sufficiently high volume of solvent, such as methyl ethyl ketone, which dissolves the oil fraction, and by then cooling the mixture in a crystallizer so that the wax fraction crystallizes, which is then separated from the liquid solvent-oil phase for instance by means of filtration. However, these methods are disadvantageous because they require the addition of a high volume of solvent, which has to be removed afterwards from the oil fraction, which makes the whole method energetically expensive and necessitates a complex plant.

In contrast thereto, the crude mixture is crystallized without addition of a solvent in the solvent-free crystallization methods. However, such processes are only suitable for oils including exclusively waxes having a comparable short carbon chain length, so that they cannot be used for fractionating crude oil including waxes having a comparable long carbon chain length.

Moreover, a more severe disadvantage is that all these processes only achieve a comparable low yield.

In addition, all these methods require on account of the comparable high wax content in the crude mixture at least in the first crystallization stage, in which crude oil is dewaxed, which is typically performed in a suspension crystallizer, a high filter surface for separating the wax crystals from the liquid oil phase. Moreover, the methods making use of a solvent require due to the comparable high wax content in the crude mixture also a high solvent content in order to dilute the oil to thereby decrease the viscosity. However, the more filter surface is required for separating the wax crystals from the liquid oil phase, the higher are the investment costs for the plant and the more solvent is required during the process, the higher are the energy operation costs for removing the solvent from the mixture after the crystallization.

In view of this, the object underlying the present invention is to provide a method for fractionating a crude mixture, which requires crystallization with less filter surface, which is operable with a lower energy consumption per unit obtained product, and which is particularly suitable for the fractionation of crude mixtures including only heavy waxes having comparable long carbon chain lengths, of crude mixtures including only light waxes having comparable short carbon chain lengths as well as of crude mixtures including heavy waxes as well as light waxes.

In accordance with the present invention, this object is satisfied by providing a method for fractionating a crude mixture comprising at least one oil and at least one wax, which comprises the following steps:

(a) carrying out a pre-fractionation stage as a layer crystallization (i) with a crude mixture comprising at least one oil and at least one wax or (ii) with a crude solvent mixture obtained by adding prior to the pre-fractionation stage at most 100% by weight of solvent relative to the weight of the crude mixture, to prepare a first fraction containing low waxy oil and a second fraction containing low oily wax, (b) carrying out a first crystallization stage including ($b_1$) a first suspension crystallization sub-stage with the first fraction containing low waxy oil to prepare a third fraction containing dewaxed oil and a fourth fraction and ($b_2$) after the first suspension crystallization sub-stage, a second suspension crystallization sub-stage with a mixture of the fourth fraction obtained in method step ($b_1$) and the second fraction containing low oily wax obtained in the pre-fractionation stage of method step (a) to prepare a fifth fraction containing slack wax and a sixth fraction.

This solution bases on the finding that by performing a pre-fractionation stage as a layer crystallization with a crude mixture or a crude solvent mixture obtained by adding prior to the pre-fractionation stage at most 100% by weight of solvent relative to the weight of the crude mixture (which is referred in the present patent application as essentially solvent free) in order to prepare a first fraction containing low waxy oil and a second fraction containing low oily wax, before carrying out a first crystallization stage including a first suspension crystallization sub-stage performed with the first fraction containing low waxy oil to prepare a third fraction containing dewaxed oil. Dewaxed oil with a comparable high purity can be obtained with comparable low energy operation costs and with crystallization having a comparable small filter surface. More specifically, the layer crystallization performed in one or more sub-stages of the pre-fractionation stage allows to remove with comparable low energy operation costs a significant part of the wax contained in the crude mixture, so that a purified mixture with comparable low wax content is fed into the first suspension crystallization stage. In addition, the layer crystallization performed in one or more sub-stages of the pre-fractionation stage allows to remove a major part of the wax contained in the crude mixture from an essentially solvent free mixture, i.e. from the crude mixture with no solvent or with at most 100% by weight of solvent relative to the weight of the crude mixture, depending on the chain length(s) of the wax(es) included in the crude mixture. On account of this reason, the suspension crystallizers of the first suspension crystallization stage require due to the comparable low wax content of the purified mixture only a comparable small filter surface. Furthermore, the second suspension crystallization sub-stage of the first suspension crystallization stage may be performed using the filter cake of the first suspension crystallization sub-stage by re-diluting it with new solvent to create a new suspension optionally further comprising the washing of the filter cake with wash liquid or solvent, respectively. Moreover, on account of the comparable low wax content of the purified mixture only low amounts of solvent have to be added to the mixture to dilute the oil, so that after the crystallization lower amounts of solvent have to be removed for example by evaporation. Also this contributes to a reduction of the overall energy operation costs. All in all, in the process of the present invention the first crystallization stage is unburdened due to the upstream pre-fractionation stage leading to a reduction of the energy operation costs for evaporating solvent compared with the above described processes of the prior art of more than 50% and to a reduction of the filter surface required in the first suspension crystallization stage of 20 to 60%.

In the present patent application the pre-fractionation stage is, even if a crystallization stage, not included in the numeration of the crystallization stages, in order to distinguish between the pre-fractionation stage and all downstream crystallization stages. Thus, the first crystallization stage of method step (b) is in fact the second crystallization stage, but denoted as first crystallization stage, because it is the first crystallization stage after the pre-fractionation stage.

Moreover, in the present patent application the term crystallization stage is used to describe a process performed in a device allowing to perform the following three functional phases: i) Crystallization (i.e. freezing out crystals of higher purities than in the input fraction, wherein the impurities concentrate in the non-solidified liquid), ii) sweating (i.e. partial melting of the crystals obtained in phase i), which is a further purification of frozen crystal mass by controlled partial melting out the impurity inclusions in the crystal mass) and iii) total melting (i.e. melting down the remaining crystal mass in order to drain it out of the crystallizer or to re-crystallize it). In such a crystallization stage the aforementioned three phases may be performed once. Alternatively, the aforementioned three phases may be performed twice or even more often in series, i.e. phases i) to iii) may be performed in one device and then phases i) to iii) may be repeated in a downstream second device, or still alternatively the phases i) and iii) may be performed without phase ii) in a suspension crystallization. In this case, the crystallization process in the first device is mentioned as first suspension crystallization sub-stage and the crystallization process in the second device is mentioned as second crystallization sub-stage. Thus, a crystallization stage may comprise one, two or more crystallization sub-stages. Moreover, any of the aforementioned devices per one sub-stage may comprise one or more crystallizers arranged in parallel to each other so as to increase the capacity of the crystallization sub-stage.

Suspension crystallization denotes in accordance with the present patent application solvent based dewaxing processes using conventional scraper crystallizers or scraped-face chillers, in which a wax-bearing solvent-oil mixture is cooled to form a suspension with solid particles of wax in oil and solvent, wherein the suspension is removed and passed to a filter or centrifuge.

The term slack wax denotes the crude wax fraction obtained after the dewaxing sub-stage of method step ($b_2$). Slack wax comprising hydrocarbons having a comparable short carbon chain length is denoted as light slack wax and is defined in accordance with the present invention as slack wax having a kinematic viscosity of at most 7 cSt at 100° C. In contrast thereto, slack wax comprising hydrocarbons having a comparable long carbon chain length is denoted as heavy slack wax and is defined in accordance with the present invention as slack wax having a kinematic viscosity of more than 7 cSt at 100° C.

A low waxy oil in accordance with the present invention means a fraction having a lower wax content than the crude mixture, wherein the fraction may contain a solvent or may be solvent-free. Likewise, a low oily wax in accordance with the present invention means a fraction having a lower oil content than the crude mixture, wherein the fraction may contain a solvent or may be solvent-free.

The pre-fractionation stage comprises one or more layer crystallization sub-stages performed each with one or more layercrystallizers, preferably with one or more static crystallizers.

Moreover, it is preferred that the crystallization of the pre-fractionation stage of method step (a) is carried out so that the first fraction obtained after crystallization comprises at most 70% by weight, preferably at most 60% by weight, more preferably at most 55% by weight and even more preferably at most 50% by weight of the wax content of the crude mixture. The more of the wax is removed during the crystallization in the pre-fractionation stage of method step (a), the less solvent is required for the first suspension crystallization stage of method step (b) and the less filter surface is required for crystallizers of the first crystallization stage of method step (b). However, in order to keep the operation costs for the pre-fractionation stage of method step (a) and the investment costs for the layer crystallizer(s) used in method step (a) into a reasonable range, it is preferred that the crystallization in the pre-fractionation stage of method step (a) is carried out so that the first fraction obtained after crystallization comprises not less than 10% by weight, preferably not less than 20% by weight and more preferably not less than 30% by weight of the wax content of the crude mixture.

In accordance with the present invention, the oil content in wax is determined in accordance with ASTM D721-06, IP158/69 (01)*. Furthermore, the wax content in oil may be determined in accordance the UOP (Universal Oil Products) method UOP46.

It is suggested in a further development of the present invention that the method further comprises (c) carrying out a second crystallization stage comprising a method step of ($c_1$) of carrying out at least one crystallization sub-stage with at least a part of the fifth fraction obtained in method step ($b_2$), wherein to the fifth fraction prior to the crystallization in method step ($c_1$) no solvent or at most 100% by weight of solvent relative to the weight of the fifth fraction are added, to prepare a seventh fraction containing deoiled light wax having an oil content of at most 5% by weight and having a kinematic viscosity of at most 7 cSt at 100° C. and an eighth fraction containing light soft wax having an oil content of more than 5% by weight and a kinematic viscosity of at most 7 cSt at 100° C.

It is particularly preferred in this embodiment that the method further comprises a method step of ($c_2$) circulating at least a part of the eighth fraction into the second suspension crystallization sub-stage of method step ($b_2$) of the first crystallization stage. Alternatively, or in addition thereto, the circulation of at least a part of the eighth fraction may be effected into the first crystallization sub-stage of method step ($b_2$) of the first crystallization stage and/or into the pre-fractionation stage of method step (a).

The aforementioned embodiments are preferred, because the combination of the two solvent based dewaxing sub-stages according to method steps ($b_1$) and ($b_2$) and downstream thereof of an at least essentially solvent-free deoiling stage according to method step (c) (i.e. in which no solvent or at most 100% by weight of solvent relative to the weight of the fifth slack wax fraction are added) carried out in at least one crystallization sub-stage with the slack wax obtained in the dewaxing sub-stage according to method step ($b_2$), leads to a very pure oil fraction and a very pure wax fraction in a comparable simple and energy-efficient method in a surprisingly high yield, in particular when at least a part of the light soft wax obtained in the deoiling performed during the second crystallization stage according to method step (c) is recirculated back into the dewaxing performed during the second crystallization sub-stage of the first crystallization stage according to method step ($b_2$). During the dewaxing of method step ($b_2$), the wax fraction crystallizes and is separated from the liquid solvent-oil mixture. The wax fraction obtained during the dewaxing of method step ($b_2$) often contains significant amounts of solvent, for example, typically 30 to 70% by weight of the wax fraction. One skilled in the art will understand that it is generally preferred to remove this solvent from the wax fraction in order to simplify further processing and minimize any environmental, health and safety issues. The wax fraction is then subjected to the solvent-free or at least essentially solvent-free deoiling of method step (c), in which a wax-rich, nearly solvent free deoiled wax fraction crystallizes as seventh fraction and is thus obtained as second product. The non-crystallizing and the sweatened out eighth light soft wax fraction is at least partially and preferably mostly recirculated into the dewaxing of method step ($b_2$), in order to thus increase the total yield of the process, surprisingly without negatively affecting the quality of the two products. Advantageously, the method in accordance with the present invention requires only comparable low amounts of solvent based on the total amount of produced deoiled wax. A further particular advantage of this process is that it is in particular suitable to fractionate crude oil including up to 50% by weight of waxes having a comparable long carbon chain length based on the total weight of the waxes. All in all, the method in accordance with the present invention results in a high yield of an oil fraction and a wax fraction, wherein both fractions have an excellent purity.

The term deoiled wax is defined in accordance with the present invention as wax having an oil content of at most 5% by weight, whereas the term light soft wax is defined in accordance with the present invention as wax having an oil content of more than 5% by weight and typically of 20 to 30% by weight.

In particular, when the crude mixture contains a major part of wax having a very long carbon chain or having a high amount of—even short chain-length—iso-(branched) material, which results in lower viscosity, but is nonetheless unsuitable for solvent-free processes, it is preferred that—alternatively to the aforementioned steps ($c_1$) and ($c_2$) or in addition to the aforementioned steps ($c_1$) and ($c_2$)—the method in accordance with the present invention further comprises (d) carrying out a third crystallization stage comprising a method step ($d_1$) of carrying out at least one crystallization sub-stage with at least a part of the fifth fraction obtained in method step (c), wherein to the fifth fraction prior to the crystallization in method step ($d_1$) more than 100% by weight of solvent relative to the weight of the fifth fraction are added, to prepare a ninth fraction containing deoiled heavy wax having an oil content of at most 5% by weight and a kinematic viscosity of more than 7 cSt at 100° C. and a tenth fraction containing heavy soft wax having an oil content of more than 5% by weight and a kinematic viscosity of more than 7 cSt at 100° C.

The optional third crystallization stage is denoted here for the ease of nomenclature as third crystallization stage, irrespective of whether the optional second crystallization stage of method step (c) is performed or not. Thus, in the case that method step (c) is not performed, but method step (d) is performed, this is still denoted as third crystallization stage, even if it is then in fact the second crystallization stage after the pre-fractionation stage. The same applies to the denotation of the ninth and tenth fractions.

In principle, any crude mixture including at least one oil and at least one wax can be used as starting mixture of the method in accordance with the present invention. Particular good results are in particular obtained, when the crude mixture comprises oil as main ingredient. Preferably, the crude mixture includes 60 to 99% by weight of oil and 1 to 40% by weight of wax, more preferably 75 to 95% by weight of oil and 5 to 25% by weight of wax and most preferably 78 to 95% by weight of oil and 5 to 22% by weight of wax.

However, the method in accordance with the present invention may also be performed with a crude mixture having a very poor quality. In this embodiment, the crude mixture preferably includes 5 to 50% by weight of oil and 50 to 95% by weight of wax, more preferably 10 to 40% by weight of oil and 60 to 90% by weight of wax and most preferably 15 to 35% by weight of oil and 65 to 85% by weight of wax.

As noted above, the method in accordance with the present invention is particularly suitable for processing crude oil mixtures including exclusively light wax as wax component, for processing crude oil mixtures including exclusively heavy wax as wax component and for processing crude oil mixtures including a mixture of light wax and heavy wax.

For example, the crude mixture may include, based on the total weight of wax, at least 50% by weight, more preferably at least 70% by weight, even more preferably at least 80% by weight, still more preferably at least 90% by weight and most preferably 100% by weight of light wax having a viscosity at 100° C. of at most 7 cSt.

In particular, the method in accordance with the present invention is particularly suitable to fractionate a cut of a waxy oil obtained from a distillation step in a distillation column as crude mixture. The cut may have been processed through a liquid-liquid extraction in order to remove or lower aromatics involved in the crude mixture. At lower concentrations of aromatics, a hydration process is also an option. Apart from that, all known oils, particularly mineral oils, vegetable oils and synthetic oils prepared for instance by Fischer-Tropsch synthesis, which are contaminated with wax, may be used as crude mixture.

In any of method steps (a) and ($c_1$) of the method in accordance with the present invention, the crude mixture may be mixed, if at all, with an appropriate volume of a solvent, which is able to efficiently dissolve the oil component of the crude mixture at the operation temperature of these method steps. Good results are in particular achieved with this regard, when the solvent is selected from the group consisting of methyl ethyl ketone, methyl isobutyl ketone, acetone, benzene, toluene, dichloroethane, methylene dichloride, methanol, methyl tertiary butyl ether, N-methylpyrolidone and mixtures of two or more of the aforementioned solvents.

In a further development of the idea of the present invention, it is proposed to use in method steps (a) and ($c_1$) as solvent either a mixture of methyl ethyl ketone and toluene or a mixture of dichloroethane and methylene dichloride. These solvent mixtures particularly efficiently dissolve oil in particular at the temperature, in which the wax component is crystallized in the crystallizer during the later method steps ($b_1$) and ($c_1$).

The aforementioned solvents are also the preferred solvents to be used in the optional method step ($d_1$).

Preferably, the crystallization sub-stages in method steps ($b_1$) and ($b_2$) of the first crystallization stage are carried out so that the third fraction containing dewaxed oil obtained in method step ($b_1$) comprise less than 5% by weight, preferably less than 3% by weight, more preferably less than 2% by weight, even more preferably less than 1% by weight and most preferably less than 0.5% by weight of wax and/or so that the fifth fraction containing slack wax obtained after method step ($b_2$) comprises less than 30% by weight, preferably less than 15% by weight, more preferably less than 12% by weight and even more preferably less than 10% by weight of oil. While in the first suspension crystallization sub-stage of method step ($b_1$), depending on the composition of the crude mixture, at least 65% by weight or even at least 75% by weight of the oil in the crude mixture is separated, in the second crystallization sub-stage of method step ($b_2$) at least 80% by weight of the remaining oil after the first suspension crystallization sub-stage is separated, so that the oil fraction after the second crystallization sub-stage of the first crystallization stage contains less than 1% by weight of wax and in particular less than 0.5% by weight of wax.

Moreover, it is preferred that the crystallization sub-stages of method steps ($b_1$) and ($b_2$) of the first crystallization stage are carried out so that the slack wax fraction obtained after method step ($b_2$) comprises less than 30% by weight, preferably less than 15% by weight, more preferably less than 12% by weight and even more preferably less than 10% by weight of oil.

After the method steps ($b_1$) and ($b_2$), the obtained oil-solvent mixtures of the third and sixth fractions may be further processed so as to remove the solvent. The solvent removal may be effected by any technique known to a person skilled in the art, such as by evaporation or membrane separation, to obtain a pure oil fraction as first product of the method in accordance with the present invention. The final oil fraction has preferably an oil concentration of at least 99% by weight and more preferably of more than 99.5% by weight.

As set out above, the method in accordance with the present invention is particularly suitable for processing crude mixtures including exclusively light wax as wax component, suitable for processing crude mixtures including exclusively heavy wax as wax component as well as suitable for processing crude mixtures including light wax as well as heavy wax as wax component. For example, a crude mixture may be used, which includes, based on the total weight of the wax included in the crude mixture, 50% by weight of a light wax having a viscosity at 100° C. of at most 7 cSt and up to 50% by weight of a heavy wax having a viscosity at 100° C. of more than 7 cSt. If the crude mixture exclusively includes light wax as wax component, the deoiling during method step ($c_1$) is preferably preformed solvent-free, i.e. without adding any solvent to the slack wax obtained in method step ($b_1$). However, if the crude mixture comprises a mixture of light wax and heavy wax, depending on the precise formulation of the slack wax a small amount of a solvent may be added to the slack wax, in order to improve the efficiency of the deoiling during method step ($c_1$). If solvent is added, for the deoiling method step ($c_1$) the solvent is added in an amount that the solvent content of the slack wax mixture introduced into the crystallization stage of method step ($c_1$) is, relative to the weight of the fifth fraction, at most 100% by weight, preferably at most 80% by weight, more preferably at most 50% by weight and even more preferably at most 20% by weight.

For the deoiling during method step ($d_1$) the solvent is added in an amount that the solvent content of the slack wax mixture introduced into the crystallization stage of step ($d_1$) is, relative to the weight of the fifth fraction, at least 100% by weight, preferably at least 200% by weight and more preferably at least 500% by weight.

As set out above, most preferably no solvent at all is added to the slack wax fraction obtained in method step ($b_2$) prior to the crystallization in method step ($c_1$).

Optionally, if necessary the slack wax fraction may be heated to a temperature above 37° C., preferably to a temperature between 40 and 70° C. before introducing it to the at least one crystallization sub-stage of the third crystallization stage of method step ($d_1$), in order to melt the wax crystals. The same is true for the second crystallization stage of method step ($c_1$).

In accordance with a particular preferred embodiment of the present invention, the second crystallization stage of method step (c) is a layer crystallization stage and preferably a static crystallization stage. Thus, preferably, the second crystallization stage comprises at least one layer crystallization sub-stage, preferably one static crystallization sub-stage. This is due to the fact that static crystallization allows to efficiently crystallize deoiled wax and to efficiently separate deoiled wax crystals from the oil containing soft wax fraction. In contrast to for example dynamic crystallization, static crystallization is suitable for crystallizing comparable highly viscous liquids, such as solvent-free slack wax mixtures. Furthermore, static crystallization has the advantage of high flexibility, of wide operating range, of easy operation since there is no crystal slurry handling and no filtration, of high reliability and of low operation costs due to the lack of moving parts. In a static crystallizer, the crystallizer is filled with melt, which contacts cooled crystallization plates, which hang in vertical direction in the crystallizer. An essential feature of static crystallization is that the melt is not stirred or otherwise agitated during the crystallization.

In order to improve the separation effect and its efficiency, after any static crystallization sub-stage, when the mother liquid is removed from the static crystallizer, the crystal layers deposited on the cooled plates may be further purified by sweating, i.e. by partially melting the crystals by gently heating the crystals close to their melting point. This effects that impurities trapped in and adhered to the crystal layers will be removed from the crystals.

In principle, only one layer crystallization sub-stage and preferably static crystallization sub-stage may be performed in the second crystallization stage of method step (c). However, in order to increase the fractionation effect and its efficiency between the deoiled light wax component and the oil containing light soft wax component, it is proposed in a further development of the idea of the present invention, to perform in the second crystallization stage of method step (c) one to five, more preferably one to three and even more preferably one or two layer crystallization sub-stages, preferably static crystallization sub-stages, and most preferably one or two static crystallization sub-stages.

If the third crystallization stage according to method step (d) is performed, in accordance with a further preferred embodiment of the present invention the method step (d) is a suspension crystallization stage. Thus, preferably, the third crystallization stage comprises at least one suspension crystallization sub-stage, preferably one scraper crystallization sub-stage. In principle, only one suspension crystallization sub-stage and preferably one scraper crystallization sub-stage may be performed in method step (d). However, in order to increase the fractionation effect and its efficiency between the deoiled heavy wax and the heavy soft wax, it is proposed in a further development of the idea of the present invention, to perform in method step (d) two to five, more preferably two to four and even more preferably three suspension crystallization sub-stages, preferably scraper crystallization sub-stages, and most preferably three suspension crystallization sub-stages.

Preferably, the second and third crystallization stages are carried out so that the seventh deoiled light wax fraction and/or ninth deoiled heavy wax fraction, respectively, obtained after the last crystallization sub-stage in method steps ($c_1$) and/or ($d_1$) comprises less than 5% by weight, preferably less than 1% by weight, more preferably less than 0.5% by weight and most preferably less than 0.1% by weight of oil. The more crystallization sub-stages are performed, the lower is the oil concentration in the deoiled wax fraction obtained after the final crystallization sub-stage and/or the higher the yield of deoiled wax in method step ($c_1$) and/or ($d_1$); however, the higher are the energy costs and the more complex is the required crystallization equipment. Due to this, a good compromise between both tendencies is obtained by performing in method step ($c_1$) three static crystallization sub-stages and/or in method step ($d_1$) three suspension crystallization sub-stages. While in the first suspension crystallization sub-stage according to method step ($b_1$) of the first crystallization stage, depending on the composition of the crude mixture, at least 70% by weight of the included oil are separated, in the second crystallization sub-stage ($b_2$) of the first crystallization stage at least 99% by weight of the remaining oil are separated, so that the deoiled wax fraction after the second crystallization sub-stage ($b_2$) of the first crystallization stage contains less than 1% by weight of wax, in particular less than 0.5% by weight of oil or even less than 0.1% by weight of oil. In contrast thereto, the eighth light soft wax fraction and/or tenth heavy soft wax fraction, respectively, contains more than 5% by weight, typically more than 7.5% by weight, even more typically more than 10% by weight and in particular 20 to 30% by weight of oil.

In the circulation according to method step ($c_2$) preferably at least a part of the eighth light soft wax fraction is circulated back to the dewaxing according to method step ($b_2$), in order to increase the yield of the process, surprisingly without negatively affecting the purity of the both obtained products, namely of the dewaxed oil fraction and of the deoiled wax fraction. Good results are in particular obtained with this regard, when in step ($c_2$) 10 to 100%, more preferably 20 to 90% and most preferably 40 to 80% of the eighth light soft wax fraction are circulated into the second crystallization sub-stage of step ($b_2$).

In addition, the present invention relates to a plant for fractionating a crude mixture comprising at least one oil and at least one wax, in particular for carrying out a method as described above, wherein the plant comprises:
  i) a source of a crude mixture,
  ii) a pre-fractionation stage comprising at least one layer crystallization sub-stage comprising at least one layer crystallizer and
  iii) a first crystallization stage comprising a first, upstream suspension crystallization sub-stage comprising at least one suspension crystallizer and at least one second, downstream suspension crystallization sub-stage comprising at least one suspension crystallizer,
wherein the plant further comprises a feeding line for feeding the crude mixture into an inlet of the layer crystallization sub-stage of the pre-fractionation stage, a first connection line connecting an outlet of the layer crystallization sub-stage of the pre-fractionation stage and an inlet of the first suspension crystallization sub-stage of the first crystallization stage and a second connection line connecting another outlet of the layer crystallization sub-stage of the pre-fractionation stage and an inlet of the second suspension crystallization sub-stage of the first crystallization stage.

In typical embodiments of the plant, the source of the crude mixture is a storage or buffer tank or tanks, preferably filled with the crude mixture to be fractionated. In several preferred embodiments of the plant, the tank(s) are in fluid connection with one or more oil or wax processing units, such as extraction and/or distillation units. In one specific embodiment, the oil or wax processing unit is part of a petrochemical refinery. In other less preferred embodiments of the plant, the tank(s) are in indirect fluid communication with the oil or wax processing units by means of intermediate transport vessels such as a tanker or railway or truck tank.

In a further preferred embodiment of the present invention, the plant further comprises:
  iv) a second crystallization stage comprising at least one layer crystallization sub-stage, preferably static crystallization sub-stage, and/or
  v) a third crystallization stage comprising at least one suspension crystallization sub-stage.

Moreover, it is preferred that the second crystallization stage of the plant comprises one to thirty, preferably two to ten and more preferably two to five layer crystallization sub-stages, preferably static crystallization sub-stages.

If required, the first crystallization stage of the plant may comprise a line for feeding solvent into the at least one suspension crystallization sub-stage.

If required, the second crystallization stage of the plant may comprise a line for feeding solvent into the at least one layer crystallization sub-stage.

According to a further embodiment of the present invention, the layer crystallization sub-stage of the pre-fractionation stage comprises at least one static crystallizer, wherein the plant further comprises:
  iv) a second crystallization stage comprising at least one layer crystallization sub-stage, preferably static crystallization sub-stage,
  v) a third crystallization stage comprising at least one suspension crystallization sub-stage and
  vi) a circulation line connecting an outlet of the at least one layer crystallization sub-stage of the second crystallization stage and an inlet of the second suspension crystallization sub-stage of the first crystallization stage, wherein the circulation line is adapted to return at least a part of the eigth fraction into the second suspension crystallization sub-stage of the first crystallization stage.

Preferably, a scraper crystallizer is used for the suspension crystallization sub-stage.

Moreover, it is preferred that the second crystallization stage comprises one to thirty, preferably two to ten and more preferably two to five layer crystallization sub-stages and the third crystallization stage comprises one to thirty, preferably two to ten and more preferably two to five suspension crystallization sub-stages.

Specific embodiments in accordance with the present invention are now described with reference to the appended drawings, wherein FIG. 1 schematically shows a first embodiment of a plant for conducting the method for fractionating a crude mixture comprising at least one oil and at least one wax in accordance with an embodiment of the present invention.

Figure 2:
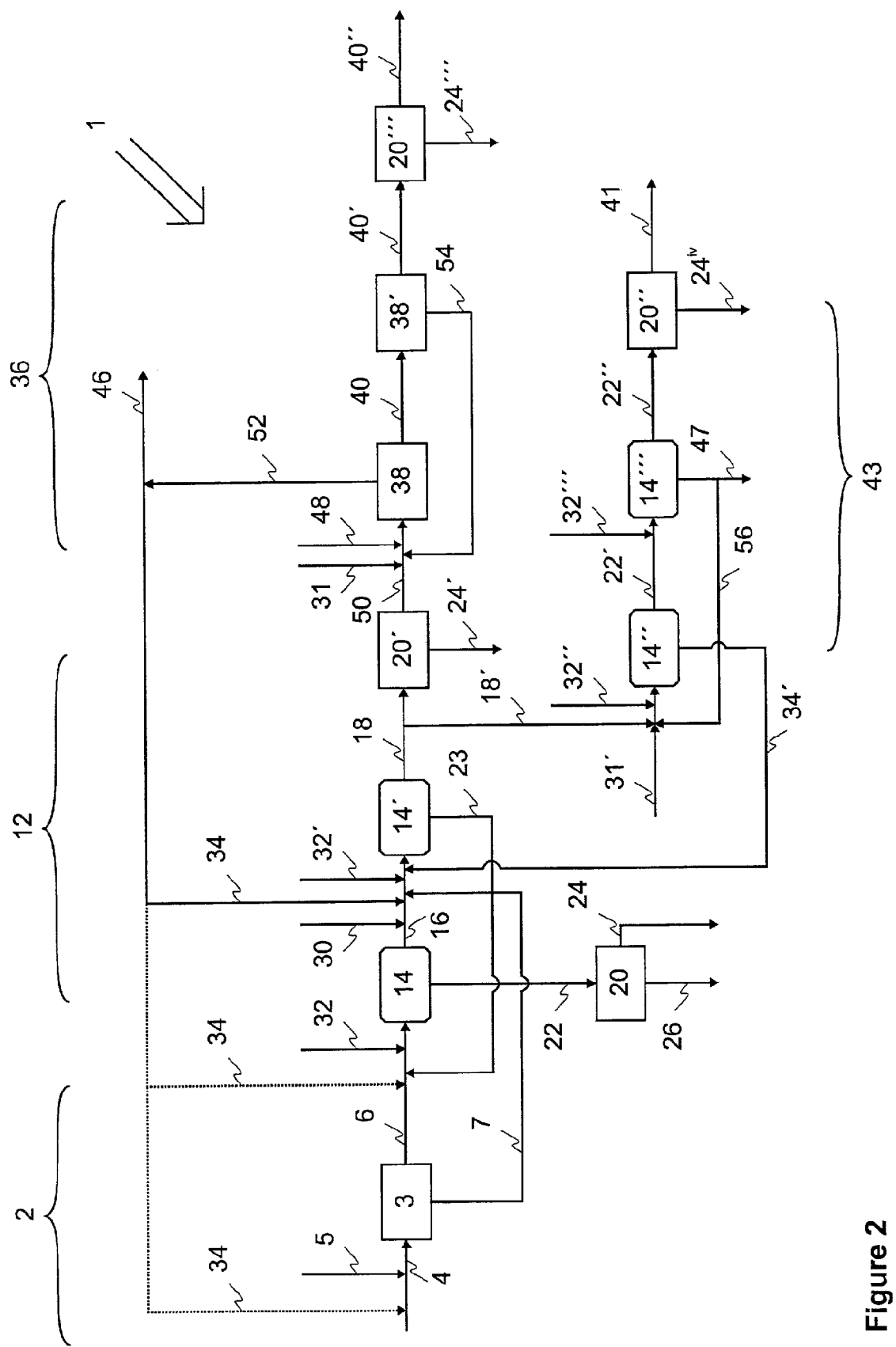

FIG. 2 schematically shows a second embodiment of a plant for conducting the method for fractionating a crude mixture comprising at least one oil and at least one wax in accordance with an embodiment of the present invention.

FIG. 1 shows a plant 1 for conducting the method for fractionating a crude mixture comprising at least one oil and at least one wax in accordance with an embodiment of the present invention. The plant 1 includes a pre-fractionation stage 2, which comprises one layer crystallization sub-stage 3, preferably static crystallization sub-stage 3, which is in fluid communication with an inlet line for crude mixture 4 and an inlet line for solvent 5. Moreover, the static crystallization sub-stage 3 comprises two outlet or removal lines, respectively, namely a removal line 6 for the first fraction (low waxy oil) and a removal line 7 for the second fraction (low oily wax). In the shown embodiment, the pre-fractionation stage 2 comprises one layer crystallization sub-stage 3, which comprises one crystallizer. However, in other embodiments, the layer crystallization sub-stage 3 may comprise more than one crystallizer, such as four to ten crystallizers, which are arranged in parallel to each other so as to increase the capacity of the layer crystallization sub-stage 3. It is also possible that the pre-fractionation stage 2 comprises in other embodiments more than one layer crystallization sub-stage 3, such as two to four layer crystallization sub-stages, which are arranged in series to each other.

In addition to the pre-fractionation stage 2, the plant 1 includes a first crystallization stage 12 comprising two suspension crystallization sub-stages 14, 14', which are in fluid communication with each other via line 16. Each of the two suspension crystallization sub-stages 14, 14' may comprise one crystallizer or more than one crystallizer being arranged in parallel to each other in order to increase the capacity of the crystallization sub-stages 14, 14'. While the first suspension crystallization sub-stage 14 comprises as removal line for the fourth fraction line 16, the second suspension crystallization sub-stage 14' comprises a slack wax removal line 18 for the fifth fraction.

Downstream of the first suspension crystallization sub-stage 14, an evaporator 20 is arranged, which is connected with the first suspension crystallization sub-stage 14 via line 22. The evaporator 20 comprises a solvent removal line 24 as well as a removal line for the third fraction of dewaxed oil 26. From the second suspension crystallization sub-stage 14', a return line 23 leads to the line 6 upstream of the first suspension crystallization sub-stage 14 for returning the sixth fraction obtained in the second suspension crystallization sub-stage 14' to the first suspension crystallization sub-stage 14.

The inlet of the first suspension crystallization sub-stage 14 is in fluid communication with the line 6 for feeding the first fraction obtained in the pre-fractionation stage 2 into the first suspension crystallization sub-stage 14, wherein the feed line 6 is in fluid communication with an inlet line for solvent 32 and with the return line for the sixth fraction 23.

The inlet of the second suspension crystallization sub-stage 14' is in fluid communication with the removal line for the fourth fraction 16, which is in fluid communication with an inlet line for crude mixture 30, an inlet line for solvent 32' and the circulation line 34.

It is noted that the crude feed inlet line 30 and the below described slack wax inlet lines 31, 31' are optional, and it is preferable, if possible to feed streams having higher wax content and lower oil content to crystallization sub-stages located progressively downstream in the plant 1.

Downstream of the second suspension crystallization sub-stage 14', a second evaporator 20' is arranged, which is connected with the suspension crystallization sub-stage 14' via the slack wax removal line 18. The evaporator 20' comprises a solvent removal line 24' as well as a slack wax removal line 50 for removing the fraction obtained after evaporating the solvent from the fifth fraction in the evaporator 20' from the first crystallization stage 12.

Moreover, the plant 1 comprises a second crystallization stage 36 comprising one layer crystallization sub-stage 38, preferably static crystallization sub-stage 38, which is in fluid connection with the slack wax removal line 50. A further solvent inlet line 48 leading to line 50 is provided and allows to add solvent to the slack wax rich fraction led to the layer crystallization sub-stage 38, preferably static crystallization sub-stage 38 of the second crystallization stage 36. Furthermore, a further slack wax inlet line 31 leading to line 50 is provided and allows to add slack wax having a reasonable lower oil content than the crude mixture streams added via line 30 before, to the slack wax rich fraction leading to the layer crystallization sub-stage 38, preferably static crystallization sub-stage, of the second crystallization stage 36. In the layer crystallization sub-stage 38, oil-free or at least essentially oil-free deoiled light wax crystallizes as seventh fraction, whereas oil-rich light soft wax as eight fraction remains liquid or becomes liquid by sweating the crystallized fraction. Due to this, the static crystallization sub-stage 38 comprises a deoiled light wax removal line 40 and a light soft wax removal line 52.

The layer crystallization sub-stage 38 may comprise one crystallizer or more than one crystallizer, which are arranged in parallel to each other in order to increase the capacity of the layer crystallization sub-stage 38. The light soft wax removal line 52 of the layer crystallization sub-stage 38 splits into a light soft wax removal line 46 and the circulation line 34, which leads into the removal line for the fourth fraction 16. Optionally, as shown by the dotted lines 34, the circulation line 34 may lead into the removal line for the first fraction 6 of the first crystallization stage 12 and/or into the inlet line for crude mixture 4 of the pre-fractionation stage 2.

In addition, the plant 1 comprises a third crystallization stage 43 comprising one suspension crystallization sub-stage 14", which is in fluid connection with the slack wax removal line 18 via line 18'. A solvent inlet line 32" is provided and allows to add solvent to the slack wax rich fraction leading to the suspension crystallization sub-stage 14" of the third crystallization stage 43. The suspension crystallization sub-stage 14" may comprise one crystallizer or more than one crystallizer, which are arranged in parallel to each other in order to increase the capacity of the crystallization sub-stage 14". Downstream of the suspension crystallization sub-stage 14", an evaporator 20" is arranged, which is connected with the suspension crystallization sub-stage 14" via line 22'. The evaporator 20" comprises a solvent removal line 24″ as well as a removal line for the purified ninth fraction of deoiled heavy wax 41. From the suspension crystallization sub-stage 14″, a circulation line 34′ leads to the line 16 upstream of the second suspension crystallization sub-stage 14′ of the first crystallization stage 12 for returning the tenth fraction obtained in the suspension crystallization sub-stage 14″ of the third crystallization stage 43 to the second suspension crystallization sub-stage 14′ of the first crystallization stage 12. From the circulation line 34′, a heavy soft wax removal line 47 diverges.

In operation, a crude mixture comprising at least one oil and at least one wax is fed via inlet line 4 as well as solvent is fed through solvent line 5 into the layer crystallizer of the layer crystallization sub-stage 3 of the pre-fractionation stage 2, wherein at most 100% by weight of solvent relative to the weight of the crude mixture is added. In the layer crystallizer of the layer crystallization sub-stage 3 of the pre-fractionation stage 2 a major part of the wax is crystallized on the scraped cooled surface of the crystallizer and removed as second fraction or low oily wax fraction, respectively from the layer crystallizer of the layer crystallization sub-stage 3 of the pre-fractionation stage 2 via the removal line 7, whereas the low waxy oil not crystallizing is withdrawn as first fraction from the layer crystallizer of the layer crystallization sub-stage 3 of the pre-fractionation stage 2 via the removal line 6. Preferably, the crystallization in the layer crystallizer of the layer crystallization sub-stage 3 of the pre-fractionation stage 2 is carried out so that the first low waxy oil fraction, or first fraction respectively, obtained after crystallization comprises at most 50% by weight of the wax content of the crude mixture.

The first low waxy oil fraction and solvent introduced via line 32 are fed through line 6 into the crystallizer of the first suspension crystallization sub-stage 14 of the first crystallization stage 12. While a solvent-wax rich fraction crystallizes as fourth fraction on the scraped cooled surface of the crystallizer of the first suspension crystallization sub-stage 14 of the first crystallization stage 12, the solvent-oil rich fraction not crystallizing is withdrawn from the crystallizer of the first suspension crystallization sub-stage 14 of the first crystallization stage 12 via line 22 as dewaxed oil fraction and is fed into the evaporator 20. In the evaporator 20, the mixture is heated so as to evaporate the solvent included in the dewaxed oil fraction, wherein via the solvent removal line 24 separated solvent is drawn off and the solvent-free oil fraction with an oil content of more than 99.5% by weight is drawn off via the oil product removal line 26.

The solvent-wax rich fourth fraction including the crystallized wax is at least partially molten and is withdrawn via the fourth fraction removal line 16 from the crystallizer of the first suspension crystallization sub-stage 14 of the first crystallization stage 12. The fourth fraction via the removal line 16, solvent via line 32′, crude mixture via line 30, the part of the eight, light soft wax fraction recirculated via line 34 and the second low oily wax fraction via line 7 are all fed together into the crystallizer of the second suspension crystallization sub-stage 14′ of the first crystallization stage 12. Again, a solvent-wax rich fraction crystallizes as fifth fraction on the scraped cooled surface of the crystallizer of the second suspension crystallization sub-stage 14′, whereas the solvent-oil rich fraction not crystallizing is withdrawn from the crystallizer of the second suspension crystallization sub-stage 14′ and is recirculated via line 23 into line 6 upstream of the first suspension crystallization sub-stage 14 of the first crystallization stage 12. The solvent-wax rich fraction including all crystallized wax is at least partially molten and is withdrawn from the crystallizer of the second suspension crystallizer 14′ of the first crystallization stage 12 via the slack wax removal line 18 as fifth fraction.

A part of the fifth fraction is introduced into the evaporator 20′. In the evaporator 20′, the mixture is heated so as to evaporate the solvent included in the solvent-wax rich fraction, wherein via the solvent removal line 24′ separated solvent is drawn off and the pre-purified wax fraction, called slack wax, is drawn off via line 50 and fed into the crystallizer of layer layer crystallization sub-stage 38 of the second crystallization stage 36. Optionally, via the further solvent inlet line 48 at most 100% solvent may be added to the slack wax rich fraction leading to the crystallizer of the layer crystallization sub-stage 38 of the second crystallization stage 36. Furthermore, optionally via the further slack wax inlet line 31 slack wax having a reasonable lower oil content than the crude mixture streams added via line 30 before may be added to the slack wax rich fraction led to the crystallizer of the layer crystallization sub-stage 38 of the second crystallization stage 36. In the layer crystallization sub-stage 38, oil-free or at least essentially oil-free deoiled light wax crystallizes as seventh fraction, whereas oil-rich light soft wax as eight fraction remains liquid or becomes liquid by sweating the crystallized fraction. The eight, oil-rich light soft wax fraction is drawn off from the layer crystallization sub-stage 38 and partially withdrawn from the plant 1 via line 46 and partially circulated into the inlet of the second suspension crystallization sub-stage 14′ of the first crystallization stage 12 via the circulation line 34, whereas the seventh, essentially oil-free deoiled light wax fraction is withdrawn from the plant 1 via line 40.

The remaining part of the fifth fraction, which is not introduced into the evaporator 20′, is introduced via line 18′ together with solvent introduced via line 32″ into the suspension crystallization sub-stage 14″ of the third crystallization stage 43. Furthermore, optionally via the further slack wax inlet line 31′ slack wax may be added to the remaining part of the fifth fraction led to the suspension crystallization sub-stage 14″ of the third crystallization stage 43. In the suspension crystallization sub-stage 14″, oil-free or at least essentially oil-free deoiled heavy wax crystallizes as ninth fraction, whereas oil-rich heavy soft wax-solvent as tenth fraction remains liquid or becomes liquid by sweating the crystallized fraction. The tenth, oil-rich heavy soft wax fraction is drawn off from the suspension crystallization sub-stage 14″ of the third crystallization stage 43 and partially withdrawn from the plant 1 via line 47 and partially circulated into the inlet of the second suspension crystallization sub-stage 14′ of the first crystallization stage 12 via the circulation line 34′, whereas the ninth, essentially oil-free deoiled heavy wax fraction is fed into the evaporator 20″. In the evaporator 20″, the mixture is heated so as to evaporate the solvent included in the solvent-wax rich fraction, wherein via the solvent removal line 24″ separated solvent is drawn off and the purified ninth, essentially oil-free deoiled heavy wax fraction is withdrawn from the plant 1 via line 41. As purified ninth fraction the ninth fraction having been purified in the evaporator 20″ by removing the solvent is meant.

The plant 1 shown in FIG. 2 is similar to that shown in FIG. 1, but differs from the plant shown in FIG. 1 by comprising in the second crystallization stage 36 a second layer-crystallization sub-stage 38′ and a second evaporator 20‴ and by comprising in the third crystallization stage 43 a second suspension crystallization sub-stage 14‴.

More specifically, downstream of the first layer crystallization sub-stage 38 of the second crystallization stage 36, a second layer crystallization sub-stage 38′ is provided, which is connected with the first layer-crystallization sub-stage 38 via line 40, in order to feed the seventh, deoiled light wax fraction obtained in the first layer crystallization sub-stage 38 into the second layer crystallization sub-stage 38' in order to further purify or deoil, respectively, the deoiled light wax fraction. The further purified deoiled light wax fraction is withdrawn from the second layer crystallization sub-stage 38' via the removal line 40' and fed into the evaporator 20''', in which the solvent is separated by evaporation from the deoiled light wax. While the deoiled light wax is withdrawn from the plant 1 via the removal line 40'', the solvent is removed from the evaporator 20''' via line 24''. The light soft wax fraction, which does not crystallize during the second layer crystallization sub-stage 38', is withdrawn from the second layer crystallization sub-stage 38' and recirculated via circulation line 54 into the line 50 leading into the first layer crystallization sub-stage 38 of the second crystallization stage 36.

Likewise thereto, downstream of the first suspension crystallization sub-stage 14'' of the third crystallization stage 43, a second suspension crystallization sub-stage 14''' is provided, which is connected with the first suspension crystallization sub-stage 14''via line 22'. Furthermore, an inlet for solvent 32''' is provided, which leads into line 22' and allows to add solvent to the deoiled heavy wax fraction transferred from the first suspension crystallization sub-stage 14'' to the second suspension crystallization sub-stage 14''' of the third crystallization stage 43. In the second suspension crystallization sub-stage 14''', the at least essentially oil-free deoiled heavy wax obtained after the first suspension crystallization sub-stage 14'' is further deoiled, wherein the further purified oil-free deoiled heavy wax crystallizes, whereas oil-rich heavy soft wax, which includes solvent or not, remains liquid or becomes liquid by sweating the crystallized fraction. The oil-rich heavy soft wax fraction is drawn off from the second suspension crystallization sub-stage 14''' of the third crystallization stage 43 and partially withdrawn from the plant 1 via line 47 and partially circulated into the inlet of the first suspension crystallization sub-stage 14'' of the third crystallization stage 43 via the circulation line 56, whereas the further purified oil-free deoiled heavy wax fraction is fed into the evaporator 20''. In the evaporator 20'', the mixture is heated so as to evaporate the solvent included in the solvent-wax rich fraction, wherein via the solvent removal line 24$^{iv}$ separated solvent is drawn off and the purified oil-free deoiled heavy wax fraction is withdrawn from the plant 1 via line 41.

REFERENCE NUMERAL LIST

1 Plant
2 Pre-fractionation stage
3 Layer crystallization sub-stage, preferably static crystallization sub-stage, as pre-fractionation stage
4 Inlet line for crude mixture of the pre-fractionation stage
5 Inlet line for solvent to the pre-fractionation stage
6 Removal line for first fraction (low waxy oil) and feed line for the first fraction into the first suspension crystallization sub-stage/First connection line
7 Removal line for second fraction (low oily wax)/Second connection line
12 First crystallization stage
14, 14' First and second suspension crystallization sub-stages of the first crystallization stage
14'', 14''' Suspension crystallization sub-stages of the third crystallization stage
16 Fourth fraction removal line
18, 18' Slack wax removal line from second suspension crystallization sub-stage
20, 20', 20'', 20''' Evaporator
22, 22', 22'' Line
23 Return or circulation line for sixth fraction
24, 24', 24'', 24''', 24$^{iv}$ Solvent removal line
26 Dewaxed oil product removal line
30 Inlet line for crude mixture
31, 31' Inlet line for slack wax
32, 32', 32'', 32''' Inlet line for solvent
34, 34' Circulation line
36 Second crystallization stage
38, 38' Layer crystallization sub-stage, preferably static crystallization sub-stage of the second crystallization stage
40, 40', 40'' Deoiled light wax (with or without solvent) removal line
41 Deoiled heavy wax removal line
43 Third crystallization stage
46 Light soft wax (with or without solvent) removal line
47 Heavy soft wax (with or without solvent) removal line
48 Further solvent inlet line
50 Slack wax removal line from evaporator
52 Line for light soft wax
54 Circulation line into the second crystallization stage
56 Circulation line into the third crystallization stage

The invention claimed is:
1. A method for fractionating a crude mixture comprising at least one oil and at least one wax, the method comprising the steps of:
  (a) performing a pre-fractionation step (2) as a layer crystallization (i) with a crude mixture comprising the at least one oil and the at least one wax or (ii) with a crude solvent mixture obtained by adding prior to the pre-fractionation step (2) at most 100% by weight of solvent relative to the weight of the crude mixture, wherein the pre-faction step (2) is sufficient to prepare a first fraction containing low waxy oil and a second fraction containing low oily wax,
  (b) preforming a first crystallization step (12) which includes the further sub-steps of:
  ($b_1$) performing a first suspension crystallization sub-step (14) with the first fraction containing low waxy oil to prepare a third fraction containing dewaxed oil and a fourth fraction; and
  ($b_2$) after the first suspension crystallization sub-step (14), performing a second suspension crystallization sub-stage (14') with a mixture of the fourth fraction obtained in the pre-fractionation stage of method sub-step ($b_1$) and the second fraction containing low oily wax obtained in step (a) to prepare a fifth fraction containing slack wax and a sixth fraction.

2. The method in accordance with claim 1, wherein the pre-fractionation stage (2) comprises one or more layer crystallization sub-stages performed each with one or more static crystallizers.

3. The method in accordance with claim 1, wherein the layer crystallization of the pre-fractionation stage (2) of method step (a) is carried out so that the first fraction obtained after crystallization comprises at most 70% by weight of the wax content of the crude mixture.

4. The method in accordance with claim 1, wherein the method further comprises
  (c) carrying out a second crystallization stage (36) comprising:
  ($c_1$) carrying out at least one crystallization sub-stage (38, 38') with at least a part of the fifth fraction obtained in method step ($b_2$), wherein to the fifth fraction prior to the crystallization in method step ($c_1$) no solvent or at most 100% by weight of solvent relative to the weight of the fifth fraction are added, to prepare a seventh fraction containing deoiled light wax having an oil content of at most 5% by weight and having a kinematic viscosity of at most 7 cSt and an eighth fraction containing light soft wax having an oil content of more than 5% by weight and a kinematic viscosity of at most 7 cSt and
  ($c_2$) optionally circulating at least a part of the eighth fraction into the second crystallization sub-stage (14') of the first crystallization stage (12) of method step ($b_2$).

5. The method in accordance with claim 4, wherein the method further comprises
  (d) carrying out a third crystallization stage (43) comprising:
  ($d_1$) carrying out at least one crystallization sub-stage (14", 14''') with at least a part of the fifth fraction obtained in method step ($b_2$), wherein to the fifth fraction prior to the crystallization in method step ($c_1$) more than 100% by weight of solvent relative to the weight of the fifth fraction are added, to prepare a ninth fraction containing deoiled heavy wax having an oil content of at most 5% by weight and a kinematic viscosity of more than 7 cSt and a tenth fraction containing heavy soft wax having an oil content of more than 5% by weight and a kinematic viscosity of more than 7 cSt.

6. The method in accordance with claim 5, wherein the crude mixture is mixed in any of method steps (a), ($c_1$) and ($d_1$) with a solvent selected from the group consisting of methyl ethyl ketone, methyl isobutyl ketone, acetone, benzene, toluene, dichloroethane, methylene dichloride, methanol, methyl tertiary butyl ether, N-methyl-pyrolidone and mixtures of two or more of the aforementioned solvents.

7. The method in accordance with claim 4, wherein in the second crystallization stage (36) in method step (c) at least one layer crystallization sub-stage (38, 38') is carried out.

8. The method in accordance with claim 4, wherein in the second crystallization stage (36) in method step (c) one to five crystallization sub-stages (38, 38') are carried out.

9. The method in accordance with claim 4, wherein in method step ($c_2$) 10 to 100% of the eighth fraction are circulated into the second crystallization sub-stage (14') of method step ($b_2$).

10. The method in accordance with claim 1, wherein the crude mixture includes 60 to 99% by weight of oil and 1 to 40% by weight of wax.

11. The method in accordance with claim 1, wherein the first suspension crystallization sub-stage (14) of the first crystallization stage (12) in method step ($b^1$) and the second suspension crystallization sub-stage (14') of the first crystallization stage (12) in method step ($b_2$) are carried out so that the third fraction containing dewaxed oil obtained in method step ($b_1$) comprise less than 5% by weight of wax and/or so that the fifth fraction containing slack wax obtained after method step ($b_2$) comprises less than 30% by weight of oil.

* * * * *